(12) United States Patent
Barzegar et al.

(10) Patent No.: US 7,394,757 B2
(45) Date of Patent: *Jul. 1, 2008

(54) CIRCUIT TO PROVIDE BACKUP TELEPHONE SERVICE FOR A MULTIPLE SERVICE ACCESS SYSTEM USING A TWISTED PAIR

(75) Inventors: Farhad Barzegar, Township of Hillsborough, Somerset County, NJ (US); Irwin Gerszberg, Kendall Park, NJ (US); Philip Andrew Treventi, Murray Hill, NJ (US)

(73) Assignee: AT&T Corp., New York, NY (US)

( * ) Notice: Subject to any disclaimer, the term of this patent is extended or adjusted under 35 U.S.C. 154(b) by 49 days.

This patent is subject to a terminal disclaimer.

(21) Appl. No.: 11/044,675

(22) Filed: Jan. 27, 2005

(65) Prior Publication Data

US 2005/0128941 A1    Jun. 16, 2005

Related U.S. Application Data

(63) Continuation of application No. 09/960,310, filed on Sep. 24, 2001, now Pat. No. 6,868,060, which is a continuation of application No. 09/001,343, filed on Dec. 31, 1997, now Pat. No. 6,347,075.

(51) Int. Cl.
*G01R 31/08* (2006.01)
(52) U.S. Cl. .................................... 370/217; 370/242
(58) Field of Classification Search ................. None
See application file for complete search history.

(56) References Cited

U.S. PATENT DOCUMENTS 4,456,925 A    6/1984    Sherlos et al.

4,620,289 A    10/1986    Chauvel (Continued)

OTHER PUBLICATIONS

U.S. Appl. No. 09/933,834, filed Aug. 22, 2001.

*Primary Examiner*—Huy D. Vu
*Assistant Examiner*—Phuongchau B Nguyen (57) ABSTRACT

A subscriber link to a central office which employs data compression, forward error correction, and advanced modulation techniques and to connect subscribers to multiple communications networks to provide an array of services. A device provides normal telephone service in the event of an equipment failure. At the subscriber end, a server called an intelligent services director (ISD) provides multiple independent connections for telephones which ordinarily connect to multiple access virtual circuits generated on the subscriber link over a twisted pair. A device called a facilities management platform (FMP) at the central office end of the link, among other things, provides interfacing of the subscriber link to various networks including a digital subscriber loop (DLC) and packet switched networks. Ordinarily telephones connected to the ISD require power and correctly functioning modems and controllers in the ISD and the FMP to have access to the outside world. A fail-safe mechanism, however allows at least one chosen phone to function in the event of a failure. The chosen phone must be capable of pulse or DTMF dialing. The connection through which it operate can be switched directly to the twisted pair media connecting to the FMP. At the FMP, the twisted pair is switched to tie the connection directly to a line card of the DLC. Alternatively, the ISD contains an interface to a specialize phone designed for the ISD environment. The interface provides the appearance to the DLC of a regular POT.

12 Claims, 8 Drawing Sheets

U.S. PATENT DOCUMENTS

| | | |
|---|---|---|
| 4,725,694 A | 2/1988 | Auer et al. |
| 4,878,048 A | 10/1989 | Gottesman et al. |
| 4,912,552 A * | 3/1990 | Allison et al. ............ 379/92.01 |
| 4,916,441 A | 4/1990 | Gombrich |
| 5,014,267 A | 5/1991 | Tompkins et al. |
| 5,157,717 A | 10/1992 | Hitchcock |
| 5,301,050 A | 4/1994 | Czerwiec et al. |
| 5,335,276 A | 8/1994 | Thompson et al. |
| 5,393,964 A | 2/1995 | Hamilton et al. |
| 5,406,564 A | 4/1995 | Okita |
| 5,406,615 A | 4/1995 | Miller, II et al. |
| 5,488,412 A | 1/1996 | Majeti et al. |
| 5,512,935 A | 4/1996 | Majeti et al. |
| 5,534,913 A | 7/1996 | Majeti et al. |
| 5,546,316 A | 8/1996 | Buckley et al. |
| 5,561,604 A | 10/1996 | Buckley et al. |
| 5,572,005 A | 11/1996 | Hamilton et al. |
| 5,583,965 A | 12/1996 | Douma et al. |
| 5,584,054 A | 12/1996 | Tyneski et al. |
| 5,587,735 A | 12/1996 | Ishida et al. |
| 5,598,455 A * | 1/1997 | Bliven et al. ............... 379/398 |
| 5,619,684 A | 4/1997 | Goodwin et al. |
| 5,644,628 A | 7/1997 | Schwarzer et al. |
| 5,671,267 A | 9/1997 | August et al. |
| 5,682,195 A | 10/1997 | Hendricks et al. |
| 5,684,918 A | 11/1997 | Abecassis |
| 5,689,553 A | 11/1997 | Ahuja et al. |
| 5,796,718 A | 8/1998 | Caterisano |
| 5,809,128 A | 9/1998 | McMullin |
| 5,812,786 A | 9/1998 | Seazholtz et al. |
| 5,859,895 A | 1/1999 | Pomp et al. |
| 5,898,673 A | 4/1999 | Riggan et al. |
| 5,898,761 A | 4/1999 | McHale et al. |
| 5,910,946 A | 6/1999 | Csapo |
| 5,930,340 A | 7/1999 | Bell |
| 5,974,043 A | 10/1999 | Solomon |
| 5,982,784 A | 11/1999 | Bell |
| 6,005,873 A | 12/1999 | Amit |
| 6,028,867 A | 2/2000 | Rawson et al. |
| 6,031,906 A | 2/2000 | Rao |
| 6,044,403 A | 3/2000 | Gerszberg et al. |
| 6,047,063 A | 4/2000 | Perry |
| 6,069,879 A | 5/2000 | Chatter |
| 6,081,517 A | 6/2000 | Liu et al. |
| 6,088,368 A | 7/2000 | Rubinstain et al. |
| 6,101,216 A | 8/2000 | Henderson et al. |
| 6,122,255 A | 9/2000 | Bartholomew et al. |
| 6,141,330 A | 10/2000 | Akers |
| 6,148,006 A | 11/2000 | Dyke et al. |
| 6,154,445 A | 11/2000 | Farris et al. |
| 6,175,565 B1 | 1/2001 | McKinnon et al. |
| 6,282,204 B1 * | 8/2001 | Balatoni et al. ............. 370/228 |
| 6,347,075 B1 | 2/2002 | Barzegar et al. |
| 6,597,686 B1 | 7/2003 | Smyk |
| 2003/0033522 A1 * | 2/2003 | Bilgic et al. ................ 713/168 |

* cited by examiner

CIRCUIT TO PROVIDE BACKUP TELEPHONE SERVICE FOR A MULTIPLE SERVICE ACCESS SYSTEM USING A TWISTED PAIR

CROSS-REFERENCE TO RELATED APPLICATIONS

This application is a continuation of prior U.S. patent application Ser. No. 09/960,310 filed Sep. 24, 2001 now U.S. Pat. No. 6,868,060 which is a continuation of prior U.S. patent application Ser. No. 09/001,343, filed Dec. 31, 1997, which issued on Feb. 12, 2002 as U.S. Pat. No. 6,347,075, each of which is hereby incorporated herein by reference.

FIELD OF THE INVENTION

This invention discloses a backup system to provide telephone service for a subscriber in a wideband communications link layer interface between various digital networks and new wideband local loop systems connecting subscribers. More particularly it relates to such a system in which such local loops employ metal conductors as the medium for such wideband local loops.

BACKGROUND OF THE INVENTION

As deregulation of the telephone industry continues and as companies prepare to enter the local telephone access market, there is a need to offer new and innovative services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as Ethernet transported over digital subscriber line (DSL) modems. Voice band data and voice signals are sent through a communications switch in a central or local office to an interexchange carrier or Internet service provider. DSL data is sent through a digital subscriber loop asynchronous mode (DSLAM) switch which may include a router. The DSLAM switch connects many lines and routes the digital data to a telephone company's digital switch.

A major problem with this configuration is that interexchange carriers attempting to penetrate the local telephone company's territory must lease trunk lines from the local telephone company switch to the interexchange company's network for digital traffic. Furthermore, the Internet service provider must least a modem from the local phone company in the DSLAM switch and route its data through the local phone company's digital switch. Thus, the local phone company leases and/or provides a significant amount of equipment, driving up the cost of entry for any other company trying to provide local telephone services and making it difficult for the interexchange companies to differentiate their services. Furthermore, since DSL modem technology is not standardized, in order to ensure compatibility, the DSL modem provided by the local telephone company must also be provided to the end user in the customer premises equipment (CPE). Additionally, since the network is not completely controlled by the interexchange companies, it is difficult to for the interexchange companies to provide data at committed rates. Any performance improvements implemented by the interexchange companies may not be realized by their customers, because the capabilities of the local telephone company equipment may or may not meet their performance needs. Thus, it is difficult for the interexchange companies to convince potential customers to switch to their equipment or to use their services. These factors ensure the continued market presence of the local telephone company.

As part of this system there is a need for improved architectures, services and equipment utilized to allow the interexchange companies to offer more products and services to customers. DSL technology, one type of communication system that can use conventional twisted pair wiring, for which a large infrastructure is in place, holds the promise of providing high bandwidth communication into any telephone subscriber's home or business. However, such high throughput subscriber links require properly functioning systems at both ends of the subscriber link. The possibility of a power outage or equipment failure is always present. The prior art does not adequately address the problem of providing backup service for such high speed links.

SUMMARY OF THE INVENTION

In order to provide an improved network, it is desirable for the interexchange companies to have access to at least one of the twisted-pair lines connecting each of the individual users to the local telephone network before the lines are routed through the conventional local telephone network equipment. It is preferable to have access to these lines prior to the splitter and modem technology offered by the local service providers. By having access to the twisted-pair wires entering the customer's premises, interexchange companies can offer better services by providing higher bandwidth, improving the capabilities of the customer premises equipment, and lowering overall system costs to the customer by enhancing competition between local exchange carriers and interexchange carriers.

The new architecture may utilize a video phone and/or other devices to provide new services to an end user, an intelligent services director (ISD) disposed near the customers premises for multiplexing and coordinating many digital services onto a single twisted-pair line; a facilities management platform (FMP) disposed in the local telephone network's central office for routing data to an appropriate interexchange company network; and a network server platform (NSP) coupled to the FMP for providing new and innovative services to the customer and for distinguishing services provided by the interexchange companies from those services provided by the local telephone network.

As part of this system, one aspect of the invention provides a so-called FMP which provides a link between the local loop to the customer premises ISD (which may also be located remotely from the customer premises) and the interexchange company network.

Briefly, in summary, a subscriber link to a central office which employs data compression, forward error correction, and advanced modulation techniques and to connect subscribers to multiple communications networks to provide an array of services. A device provides normal telephone service in the event of an equipment failure. At the subscriber end, a server called an intelligent services director (ISD) provides multiple independent connections for telephones which ordinary connect to multiple access virtual circuits generated on the subscriber link over a twisted pair. A device called a facilities management platform (FMP) at the central office end of the link, among other things, provides interfacing of the subscriber link to various networks including a digital subscriber loop (DLC) and packet switched networks. Ordinarily telephones connected to the ISD require power and correctly functioning modems and controllers in the ISD and the FMP to have access to the outside world. A fail-safe mechanism, however allows at least one chosen phone to function in the event of a failure. The chosen phone must be capable of pulse or DTMF dialing. The connection through which it operate can be switched directly to the twisted pair media connecting to the FMP. At the FMP, the twisted pair is switched to tie the connection directly to a line card of the DLC.

BRIEF DESCRIPTION OF THE DRAWINGS

The foregoing summary of the invention, as well as the following detailed description of preferred embodiments, it is better understood when read in conjunction with the accompanying drawings, which are included by way of example, and not by way of limitation with regard to the claimed invention.

In the drawing.

DETAILED DESCRIPTION OF PREFERRED EMBODIMENTS

Figure 1:
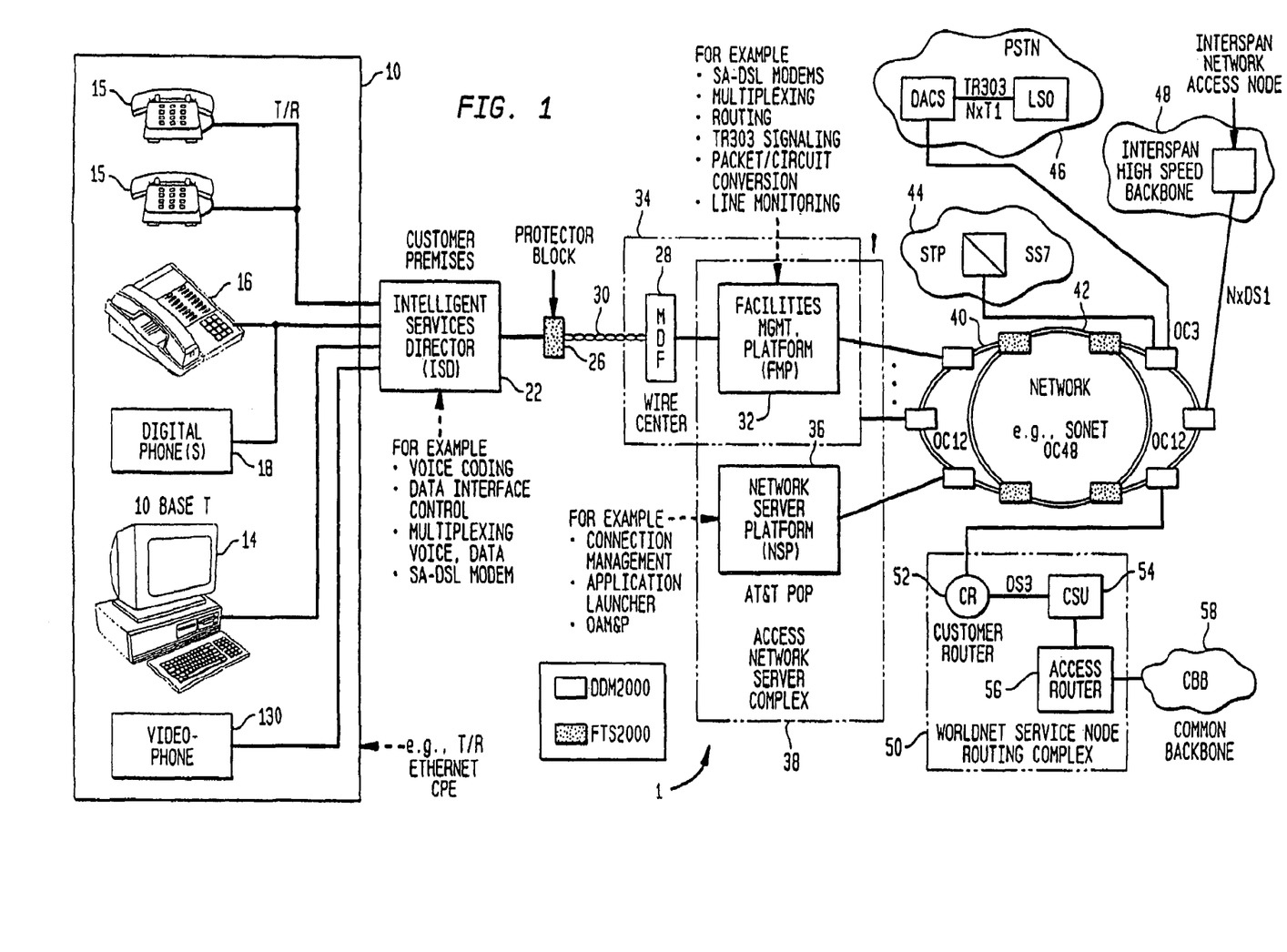
FIG. 1 illustrates an embodiment of a hybrid fiber twisted pair local loop architecture.

The following description provides an overview of how the primary subject of this application, a life-line support system, fits into an overall network architecture. Referring to FIG. 1, a first exemplary communication network architecture employing a hybrid fiber, twisted-pair (HFTP) local loop 1 architecture is show. An intelligent services director (ISD) 22 may be coupled to a central office 34 via a twisted-pair wire 30, a connector block 26, and/or a main distribution frame (MDF) 28. The ISD 22 and the central or local office 34 may communicate with each other using, for example, framed, time division, frequency-division, synchronous, asynchronous and/or spread spectrum formats, but in exemplary embodiments uses DSL modem technology. The central office 34 preferably includes a facilities management platform (FMP) 32 for processing data exchange across the twisted-pair wire 30. The FMP 32 may be configured to support plain old telephone service (POTS) by handling voice signals digitized by the ISD 22 in various ways. Voice data can be multiplexed directly onto the digital backplane of a PSTN or modified digital loop carrier or it can be formatted for transmission directly on a digital (for example, interexchange) network which may be optical or ATM. Ultimately voice data may be received by a remote PSTN 46 and transmitted to a called party or through a remote FMP 32 to the called party. Demodulation of the subscriber link signal (e.g., DSL) is handled by a, for example, tethered virtual radio channel (TVRC) modem (shown in FIG. 4A). Non-voice data may be output to a high speed backbone network (e.g., a fiber-optic network) such as an asynchronous transfer mode (ATM) switching network.

The FMP 32 may process data and/or analog/digitized voice between customer premise equipment (CPE) 10 and any number of networks. For example, the FMP 32 may be interconnected with a synchronous optical network (SONET) 42 for interconnection to any number of additional networks such as an InterSpan backbone 48, the PSTN 46, a public switch switching network (e.g. call setup SS7-type network 44), and/or a network server platform (NSP) 36. Alternatively, the FMP 32 may be directly connected to any of these networks. One or more FMPs 32 may be connected directly to the high speed backbone network (e.g., direct fiber connection with the SONET network 42) or they may be linked via a trunk line (e.g., trunks 40 or 42) to one or more additional networks. FMP 32 may also interconnect with other FMP 32 units to limit traffic on other network facilities for calls destined for nearby FMPs 32. Moreover, calls between two subscribers linked to the same FMP 32 may communicate through the FMP 32 without being linked to any of the other network facilities. In addition, the FMP 32 may provide internal caching to limit the burden on the external network facilities. For example, a movie might be cached during certain time of the day if one particular movie is being requested by many subscribers at around the same time.

Although the possibly massive demands of a cache for user data may make it economically unfeasible to cache data such as movies, the FMP 32 would, preferable, have an internal memory or other data storage that would contain information about each subscriber to which it is linked. For example, a subscriber may not subscribe to all the services the FMP 32 makes available. For example, one subscriber might want its calls, where possible, handled by the interexchange carrier by directly routing them through one of the digital networks (e.g., ATM) owned by the interexchange carrier or other owner of the FMP 32. Another subscriber may prefer to go through the local phone company through the modified DLC 87 for at least some calls depending on the pricing and features offered by the competing carriers. This data is preferable stored on such an internal storage at the FMP 32. Such data could be updated by the NSP 46 as required. Storing such data, aside from saving bandwidth of external networks, will also speed the handling of calls.

The NSP 36 may provide a massive cache storage for various information that may be provided across the SONET 42 to the FMP 32 and out to the ISD 22. The NSP 36 and the FMP 32 may collectively define an access network server complex 38. The NSP 36 may be interconnected with multiple FMP's 32. Furthermore, each FMP 32 may interconnect with one or more IDSs 22. The NSP 36 may be located anywhere but is preferably located in a point-of-presence facility. The NSP 36 may further act as a gateway to, for example, any number of additional services. The major tasks of the NSP 46 is to handle connection management, act as an application launcher and provide operation administration maintenance & provisioning.

The ISD 22 may be interconnected to various devices such as a videophone 130, other digital phones 18, set-top devices, computers, and/or other devices comprising the customer premise equipment 10. The customer premise equipment 10 may individually or collectively serve as a local network computer at the customer site. Applets may be downloaded from the NSP 36 into some or all of the individual devices within the customer premise equipment 10. Where applets are provided by the NSP 36, the programming of the applets may be updated such that the applets are be continually configured to the latest software version by the interexchange carrier. In this way, the CPE 10 may be kept up to date by simply re-loading updated applets. In addition, certain applets may be resident on any of the CPE 10. These resident applets may be periodically reinitialized by simply sending a request from, for example, a digital phone 18 and/or a videophone 130 to the FMP 32 and thereafter to the NSP 36 for reinitialization and downloading of new applets. To ensure wide spread availability of the new features made possible by the present architecture the customer premise equipment may be provided to end users either at a subsidized cost or given away for free, with the cost of the equipment being amortized over the services sold to the user through the equipment.

Figure 2:
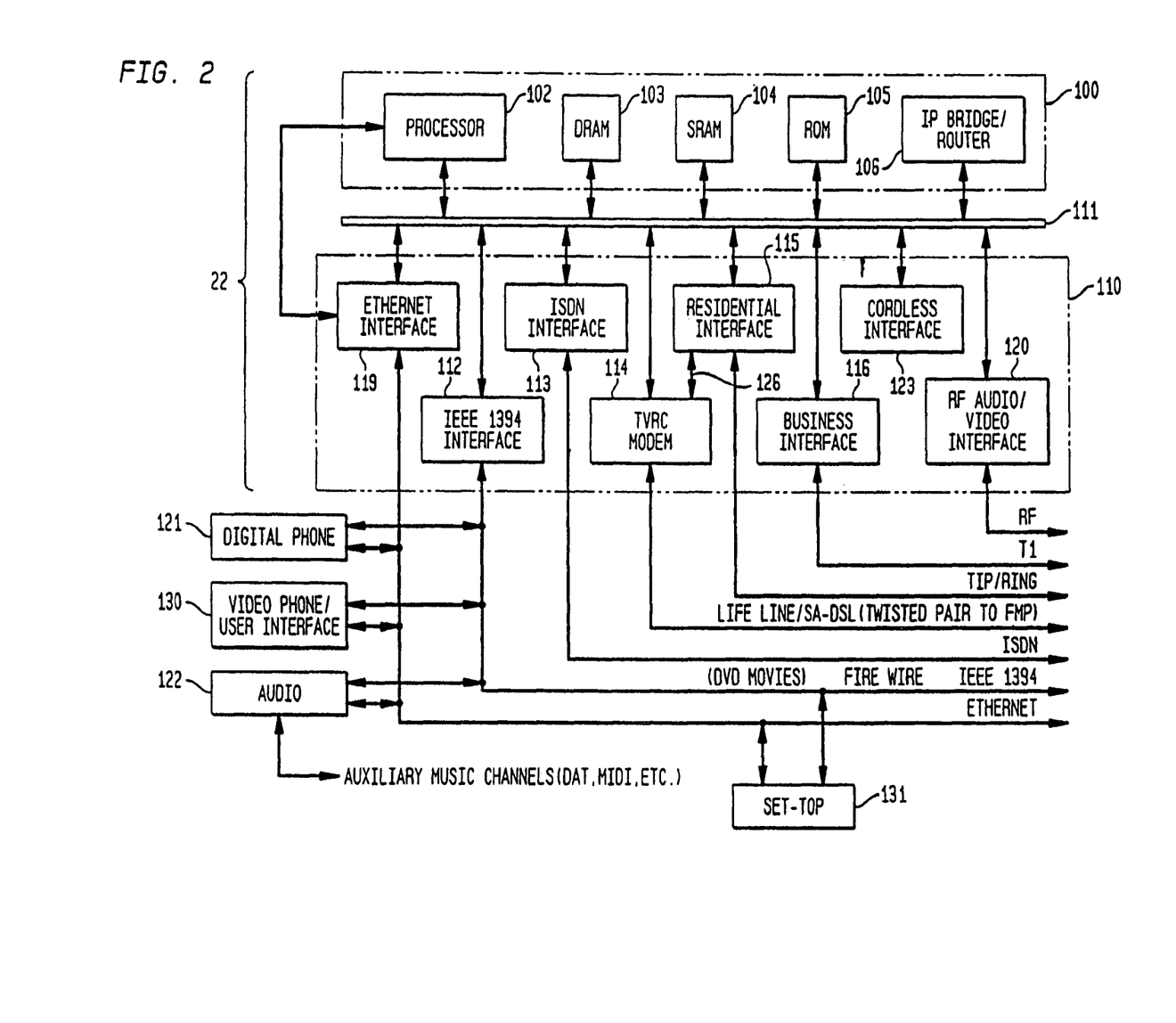
FIG. 2 is a block diagram of an of an embodiment of an intelligent services director consistent with the architecture shown in FIG. 1.

Referring to FIG. 2, the ISD 22 may connect with a variety of devices including analog and digital voice telephones 15, 18; digital videophones 130, devices for monitoring home security, meter reading devices (not shown), utilities devices (not shown), facsimile devices 16, personal computers 14, and for other digital or analog devices. Some or all of these devices may be connected with the ISD 22 via any suitable mechanism such as a single and/or multiple twisted-pair wires and/or a wireless connection. For example, a number of digital devices may be multi-dropped on a single twisted-pair connection. Similarity, analog phones and other analog devices may be multi-dropped using conventional techniques.

The ISD 22 may be located within the home/business or mounted exterior to the home/business. The ISD 22 may operate from electrical power supplied by the local or central office 34 and/or from the customers power supplied by the customer's power company. Where the ISD 22 includes a modem, it may be desirable to power the ISD 22 with supplemental power from the home in order to provide sufficient power to enable the optimal operation of the modem.

As shown in FIG. 2, in some embodiments the ISD 22 may include a controller 100 which may have any of a variety of elements such as a central processing unit 102, a DRAM 103, and SRAM 104, a ROM 105 and/or an internet protocol (IP) bridge router 106 connecting the controller 100 to a system bus 111. The system bus Ill may be connected with a variety of network interface devices 110. The network interface devices 110 may be variously configured to include an integrated services digital network (ISDN) interface 113, an Ethernet interface 119, an IEEE 1394 "fire wire" interface 112 (e.g., for digital a videodisc device (DVD)), a digital subscriber line (DSL) modem interface with 114 (e.g., for a TVRC modem, a residential interface 114, (e.g., standard POTS phone systems such as tip ring), a business interface 116 (e.g., a T1 line and/or PABX interface), a radio frequency (RF) audio/video interface 120 (e.g., a cable television connection), and a cordless phone interface 123 (e.g., a 900 MHZ transceiver). Connected to one of the network interfaces and/or the system bus 111 may be any number of devices such as an audio interface 122 (e.g., for digital audio, digital telephones, digital audio tape (DAT) recorders/players, music for restaurants MIDI interface, DVD, etc.) a digital phone 121, a videophone/user interface 130, a television set-top device 131 and/or other devices. Where the network interface is utilized, it may be desirable to use, for example, the IEEE 1394 interface interface 112 and/or the Ethernet interface 119.

The ISD 22 may be variously configured to provide any number of suitable services. For example, the IDS 22 may offer high fidelity radio channels by allowing the user to select a particular channel and obtaining a digitized radio channel from a remote location and outputting the digital audio, for example, on audio interface 122, video phone 130, and/or digital phones 121. A digital telephone may be connected to the audio interface 122 such that a user may select any one of a number of digital radio channels by simply having the user push a channel button on the telephone and have the speaker phone output particular channels. The telephone may be preprogrammed to provide the radio channels at a particular time, such as a wake up call for bedroom mounted telephone, or elsewhere in the house. The user may select any number of services on the video phone and/or other user interface such as a cable set-top device. These services may include any number of suitable services such as weather, headlines in the news, stock quotes, neighborhood community services information, ticket information, restaurant information, service directories (e.g., yellow pages), call conferencing, billing systems, mailing systems, coupons, advertisements, maps, classes, Internet, pay-per-view (PPV), and/or other services using any suitable user interface such as the audio interface 122, the video phone/user interface 130, digital phones, 121 and/or another suitable device such as a settop 131.

In further embodiments, the ISD 22 may be configured as an IP proxy server such that each of the devices connected to the server utilize transmission control protocol/internet protocol (TCP/IP) protocol. This configuration allows any device associated with the ISD 22 to access the Internet via an IP connection through the FMP 32. Where the ISD 22 is configured as an IP proxy server, it may accommodate additional devices that do not support the TCP/IP protocol. In this embodiment, the ISD 22 may have a proprietary or conventional interface connecting the ISD 22 to any associated device such as to the set top box 131, the personal computer 14, the video telephone 130, the digital telephone 18, and/or some other end user device.

In still further embodiments, the ISD 22 may be compatible with multicast broadcast services where multicast information is broadcast by a central location and/or other server on one of the networks connected to the FMP 32, e.g., an ATM-switched network. The ISD 22 may download the multicast information via the FMP 32 to any of the devices connected to the ISD 22. The ISD 22 and/or CPE 10 devices may selectively filter the information in accordance with a specific customer user's preferences. For example, one user may select all country music broadcasts on a particular day while another user may select financial information. The ISD 22 and/or any of the CPE 10 devices may also be programmed to store information representing users' preferences and/or the received uni-cast or multicast information in memory or other storage media for later replay. Thus, for example, video clips or movies may be multicast to all customers in the community with certain users being preconfigured to select the desired video clip/movie in real time for immediate viewing and/or into storage for later viewing.

Figure 3A:
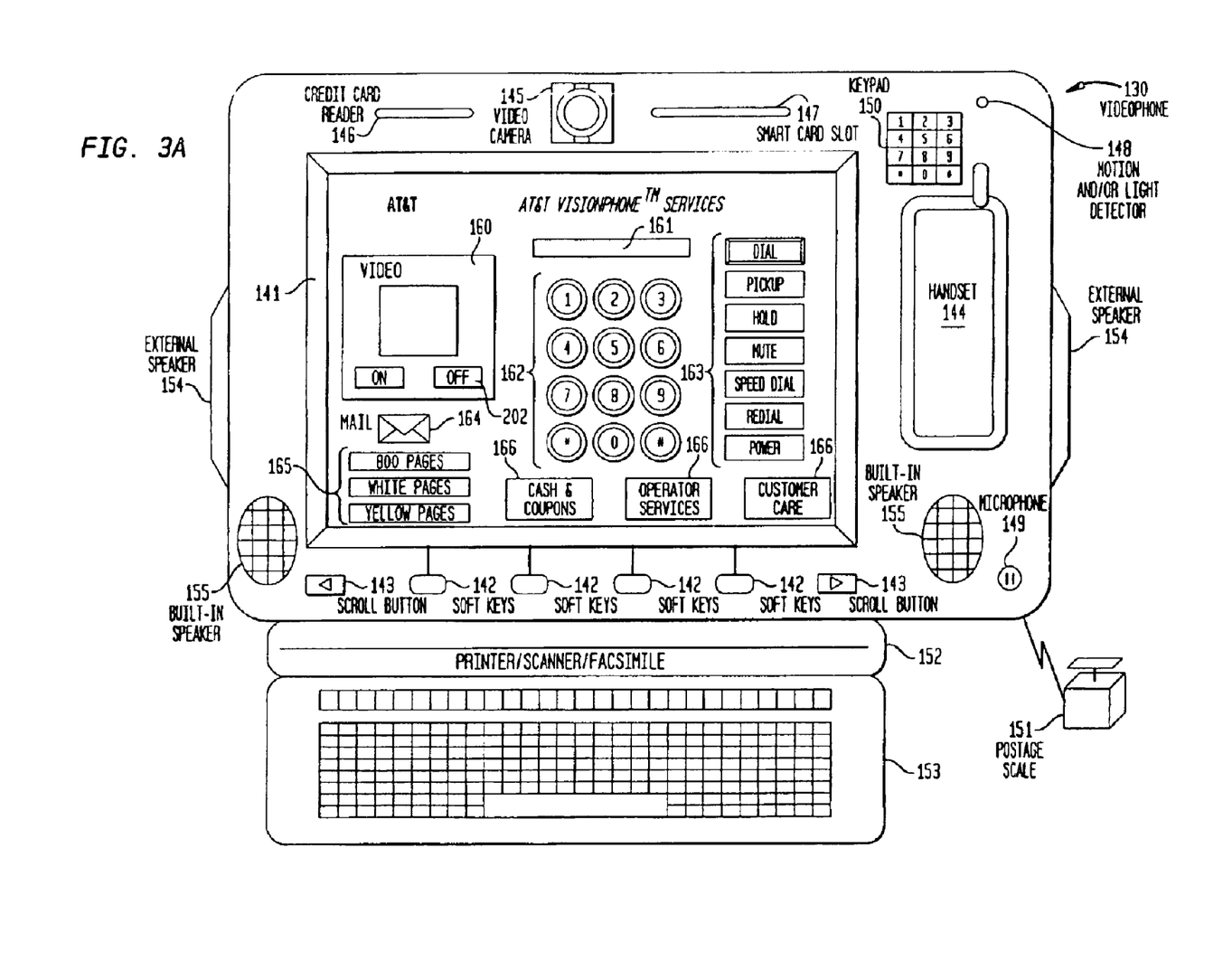
FIGS. 3A and 3B illustrate an embodiment of a video phone consistant with the architecture shown in FIG. 1.
Figure 3B:
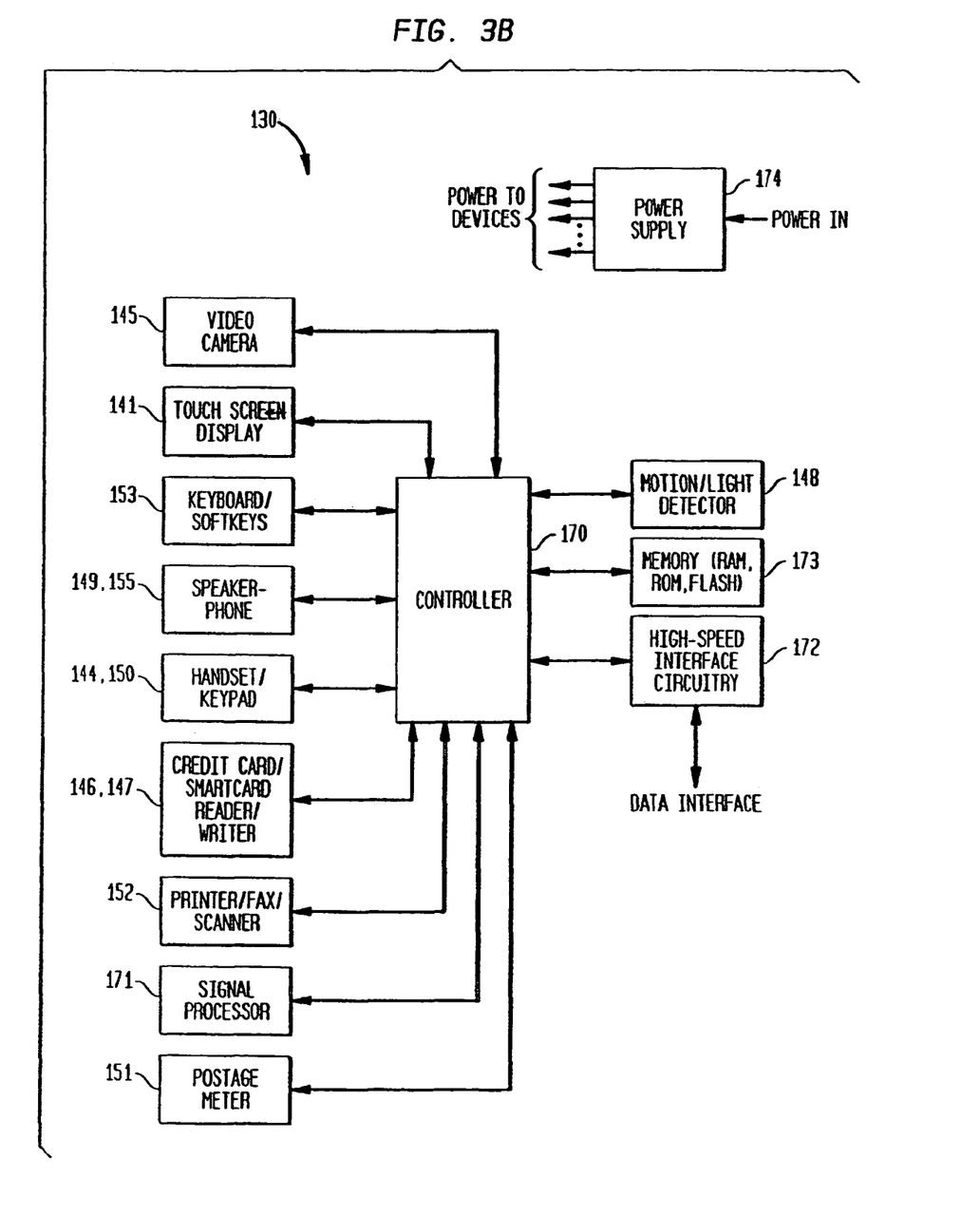

Referring to FIG. 3A, a videophone 130 may include a touch screen display 141 and soft keys 142 around the perimeter of the display 141. The display may be responsive to touch, pressure and/or light input. Some or all of the soft keys 142 may be programmable and may vary in function depending upon, for example, the applet being run by the videophone 130. The function of each soft key may be displayed next to the key on the display 141. The functions of the soft keys 142 may also be manually changed by the user by pressing scroll buttons 143. The videophone 140 may also include a handset 144 (which may be connected via a cord or wireless connection to the rest of the videophone and/or directly to the ISD), a keypad 150, a video camera 145, a credit card reader 146, a smart card slot 147, a microphone 149, a motion and/or light detector 148, built-in speaker(s) 155, a printer/scanner/facsimile 152, and/or external speakers 154 (e.g., stereo speakers). A keyboard 153 and/or a postage scale 151 may also be connected to the videophone 130. Any or all of the above-mentioned items may be integrated with the videophone unit itself for may be physically separate from the videophone unit. A block diagram of the video phone unit is shown in FIG. 3B. Referring to FIG. 3B, in addition to the items above, the video phone 130 may also include a signal processor 171, high speed interface circuitry 172, memory 173, power supply 174, all interconnected via a controller 170.

When the videophone 130 is used as a video telephone, the display 141 may include one or more video window(s) 160 for viewing a person to whom a user is speaking and/or showing the picture seen by the person on the other end of the video phone. The display may also include a dialed-telephone-number window 161 for displaying the phone number dialed, a virtual keypad 162, virtual buttons 163 for performing various telephone functions, service directory icons 165, a mail icon 164, and/or various other service icons 166 which may be used, for example, for obtaining coupons or connecting with an operator. Any or all of these items may be displayed as virtual buttons and/or graphic icons and may be arranged in any combination. Additionally, any number of other display features may be shown on the video phone in accordance with one or more of the applications incorporated by reference below.

Figure 4A:
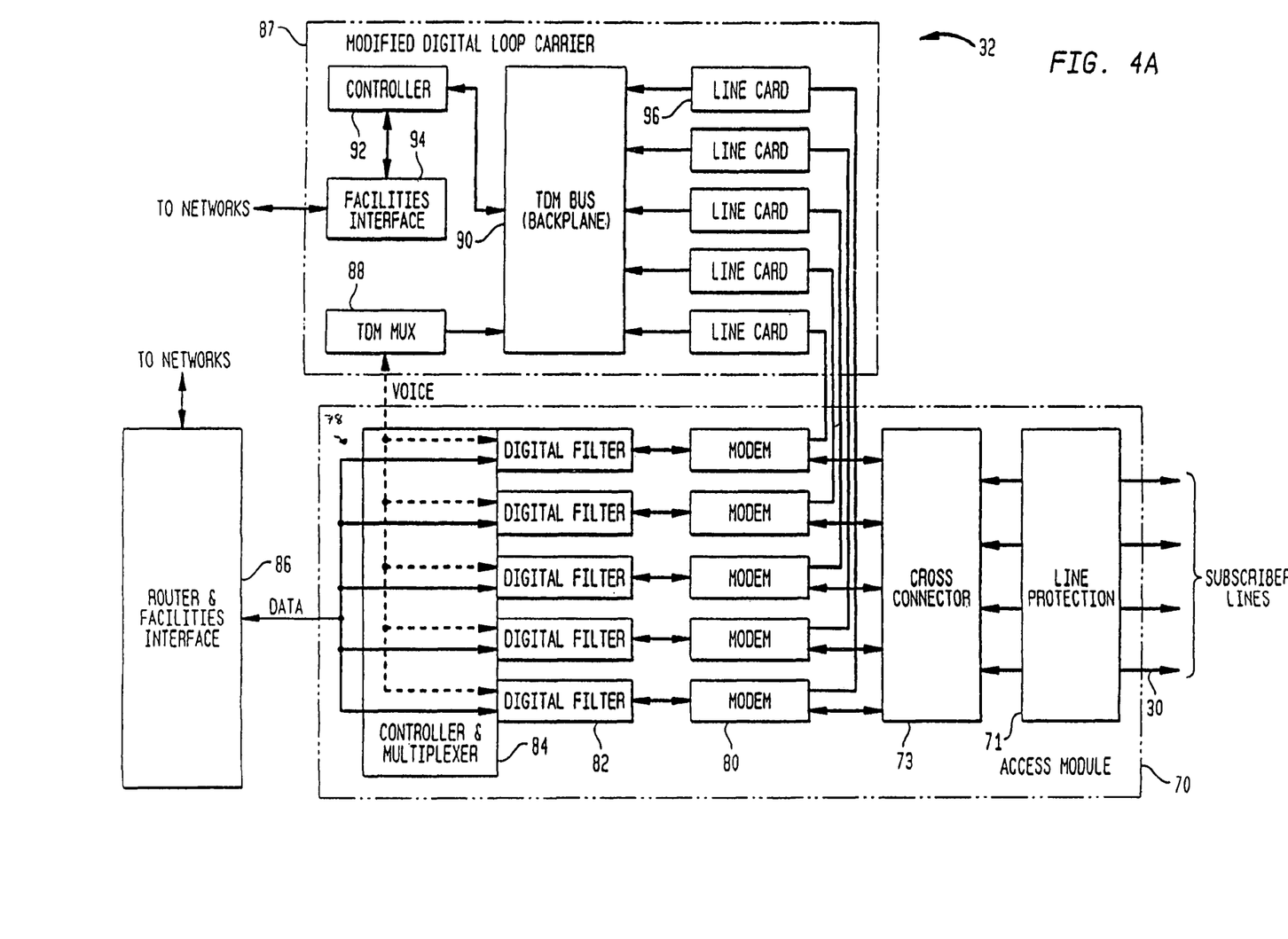
FIG. 4A is a block diagram of an embodiment of a facilities management platform consistent with the architecture shown in FIG. 1.

Referring to FIG. 4A, the FMP 32 may coordinate the flow of data packets, separate voice signals from other signals, perform line monitoring and switching functions, and/or convert between analog and digital signals. The FMP 32 may process data sent from the CPE 10 to the central or local office 34 by separating and reconstructing analog voice signals, data, and control frames. The FMP 32 may pro data sent from the central or local office 34 to the CPE 10 by separating control messages from user information, and configure this information into segments for transport across the digital subscriber loop. The FMP 32 may also terminate all link layers associated with the digital subscriber loop.

In some embodiments, the FMP 32 may include an access module 70 and a digital loop carrier 87. The access module 70 may include a line protector 71, a cross-connector 73, a plurality of TVRC modems 80, a plurality of digital filters 82, a controller multiplexer 84, and/or a router and facilities interface 86. The digital loop carrier 87 may include a plurality of line cards 96, a time domain multiplexing CAM) multiplexer (MUX) 88, a TDM bus 90, a controller 92, and/or a facilities interface 94.

During normal operations, digital signals on the subscriber lines 30 (e.g., twisted-pair lines) containing both voice and data may be received by the TVRC modems 80 via the line protector 71 and the cross-connector 73. Preferably, the line protector 71 includes lightning blocks for grounding power surges due to lightning or other stray voltage surges. The TVRC modems 80 may send the digital voice and/or data signals to the controller multiplexer 84 and the digital filters 82. The digital filters 82 may separate the voice signals from the digital data signals and the contoller multiplexer 84 may then multiplex the voice signals and/or data signals received from the digital filters 82. The controller multiplexer 84 may then send multiplexed voice signals to the TDM MUX 88 and the data signals to the router and facilities interface 86 for transmission to one or more external networks. The TDM MUX 88 may multiplex the voice signals from the controller multiplexer 84 and/or send the voice signals to the TDM bus 90, which may then send the digital voice signals to the controller 92 and then to the facilities interface 94 for transmission to one or more external networks. Alternatively, voice data slay be repackaged by controller & multiplexer 84 for application director to any of various digital networks without going through modified DLC 87. Both the router and facilities interface 86 and the facilities interface 94 may convert between electrical signals and optical signals when a fiber optic link is utilized.

When there is a failure of the digital data link (e.g., if there is a failure of the TVRC modems 80 at the FMP 32 or the TVRC modem 114 at the ISD 22), only analog voice signals might be sent over the subscriber lines 30. In such a case, the analog voice signals may be directly routed to the line cards 96, bypassing the TVRC modems 80, the digital filters 82, the controller multiplexer 84, and the TDM MUX 88. Thus, voice communication is ensured despite a failure of the digital data link. The line cards 96 may convert the analog voice signals into digital format (e.g., TDM format) and send the digitized voice data onto the TDM bus 90 and eventually through the controller 92 and the facilities interface 94 for transmission to one or more external networks.

Figure 4B:
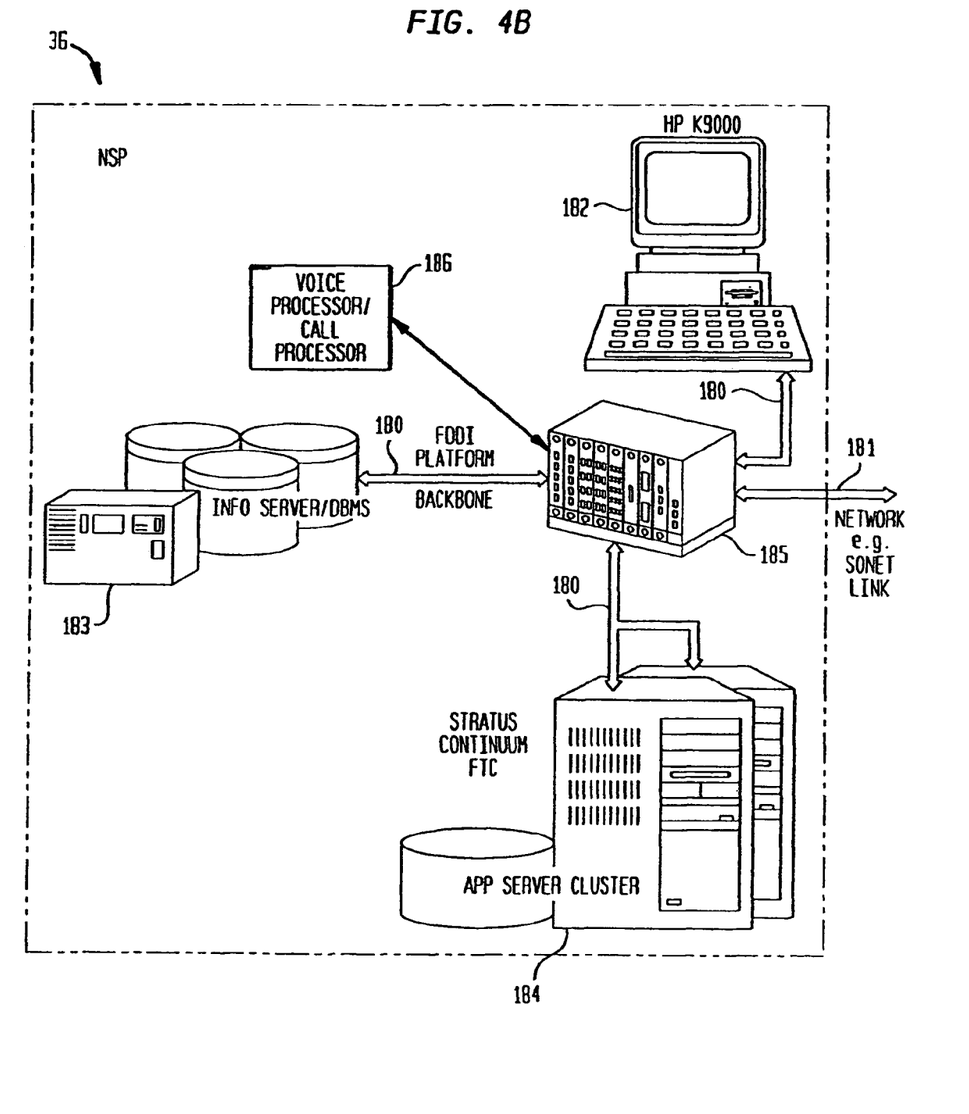
FIG. 4B illustrates a block diagram of an embodiment of a network server platform consistent with the architecture shown in FIG. 1.

Referring to FIG. 4B, the NSP 36 may be variously configured to provide any number of services provided by a server such as information services, Internet services, pay-per-view movie services, data-base services, commercial services, and/or other suitable services. In the embodiment shown in FIG. 4B, the NSP 36 includes a router 185 having a backbone 180 (e.g., a fiber distributed data interface (FDDI) backbone) that interconnects a management server 182, an information/database server 183, and/or one or more application server clusters 184. The NSP 36 may be connected via the router 185 by a link 181 to one or more external networks, NSPs 36, and/or an FMPs 32. The information/data base server 183 may perform storage and/or database functions. The application server duster 184 may maintain and control the downloading of applets to the ISD 22. The NSP 36 may also include a voice/call processor 186 configured to handle call and data routing functions, set-up functions, distributed operating system functions, voice recognition functions for spoken commands input from any of the ISD connected devices as well as other functions.

Referring again to FIGS. 1 and 4A, as mentioned, the FMP 32 serves a link-layer termination for the high-speed subscriber data link for example, a DSL link between the ISD 22 at a customer premise and the digital network of an interexchange carrier (shown in FIG. 1). The FMP 32 communicates with the ISD 22, receiving signaling data, user data, and voice data over (preferably) a high speed DSL link. The signaling data tells the FMP 32 how to handle (route) the voice and user data. There are two major routing alternatives, to route as a normal call through the modified DLC 87 or to route directly through the interexchange carrier network by coning the user and voice data directly from the format of the subscriber link to the format of the interexchange carrier network used. In the latter case, a dialogue between the FMP 32 and the NSP 46 nay be established to inform the NSP 46 that a call is impending or terminated and to request that it allocate or deallocate bandwidth of the network accordingly. The following is a detailed description of the elements of a preferred embodiment of the FMP 32.

FMP 32 receives digital data over a twisted pair connection (preferred, but could be any other medium) which terminates at a line protection block 71. In an embodiment, the FMP 32 supports DSL communication with the ISD 22. The termination to which twisted pair wiring connects the ISD 22 with the FMP 32 is responsible for terminating the DSL link. This includes providing Borscht as well as DSL modem functions.

During normal operation the DSL Facilities Termination subsystem is responsible for providing over-voltage protection. This is the same as in a convention wire termination. In addition, the FMP 32 includes DSL modems or TVRC modems 80 to convert analog symbols to digital data and vice versa. These techniques are described in the literature and applications incorporated by reference in the present application.

Another function of the FMP 32 is to provide in-service testing/monitoring of the ISD facility. This aspect stems from the fact that the FMP 32 stands in the shoes of the DLC it supplements.

On the network side of the modems, data must be framed before being modulated to be transmit over the DSL link. Other preparations include encoding for forward error correction (for data not suited to retransmission such as voice data) and interleaving (to reduce drastic effects of impulsive noise or fading).

The final output of the termination/modem subsystem is a stream of DSL frames containing higher-layer protocol data. In the CPE-to-network direction. The controller & multiplexer 84 processes the DSL frames it receives from the Facilities Termination subsystem to terminate any link layers associated with the DSL segment of the connection, (in an embodiment) re-construct (e.g. Ipv6) packets from the DSL frames, and separate (IP) packets containing voice, data, and signaling (call-routing or data routing) information.

In an embodiment of the invention, for purposes of transmitting voice data directly from an external digital network (as opposed to through modified DLC 87) data containing voice (for examples in voice-packets) are delivered by the controller & multiplexer 84 to a packet-circuit translation subsystem (not shown separately) by an internal network system (also not shown separately). User data packets are delivered to/from the external networks (which can be interexchange carrier networks or any other external network) and signaling packets to/from the subscriber signaling subsystem of the external network where user data or voice data are routed direct as packets or to/from controller 92 where user or voice data are routed through modified DLC 87.

In the network-to-CPE direction, the controller & multiplexer 84 processes the packets it receives from all subscriber signaling and external routing subsystems. This involves multiplexing (at the packet level) voice, data and subscriber signaling packets bound for a single DSL link. It also involves mapping packets onto DSL frames, and terminating the FMP-side of any link layers associated with the DSL link. Packets traveling in the network-to-CPE direction are sent directly to the DSL termination for delivery to ISD 22.

For purposes of transferring data between its subsystems, such as within the controller & multiplexer 84, voice, data, and signaling packets are transported via an internal routing system (not shown separately) that is at least logically, and perhaps physically also, distinct from the external networks with which the FMP 32 communicates. This is useful for reliability, security, and availability reasons.

In FIG. 4A, various elements of the FMP 32, which could be on a single plug-in card that accommodates terminations for four subscribers lines, are shown. Each of the four subscribe can be connected to a respective (any) one of five TVRC modems 80 (TVRC or DSL preferred but could be any type of digital modem) via a cross connector switch. In the event of a failure of one of modems the ISD 22 indicated by, for example, irregular communications detected in controller & multiplexer 84 or controller 92, cross connector 73 will switch the subscriber from the suspected bad TVRC modem to a spare one of the five TVRC modems 80. The FMP 32 could employ failure indicators (not shown) to advise maintenance personnel that a modem has been switched out and that it should be replaced. TVRC modems 80 are high speed digital modems with the ability to transmit and receive data at rates of 1 Mbit or more using advanced modulation, error-correction coding, and data compression techniques. These are preferred known technologies and are described in other references including some of the copending applications incorporated by reference in the present application. No particular technology or technique is identified with modems 80 and more advanced technologies may be employed with the present invention.

Figure 5:
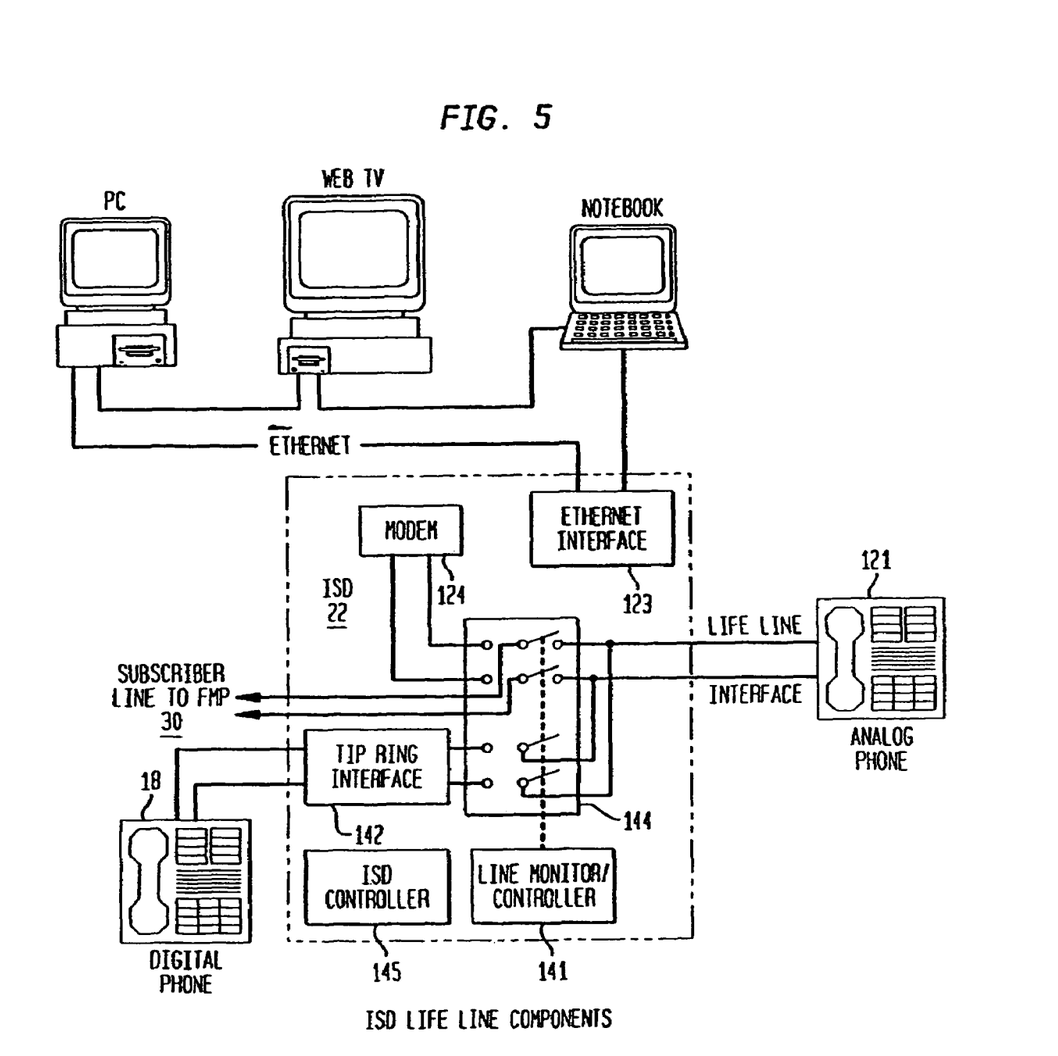
FIG. 5 illustrates life line components of the ISD.
Figure 6:
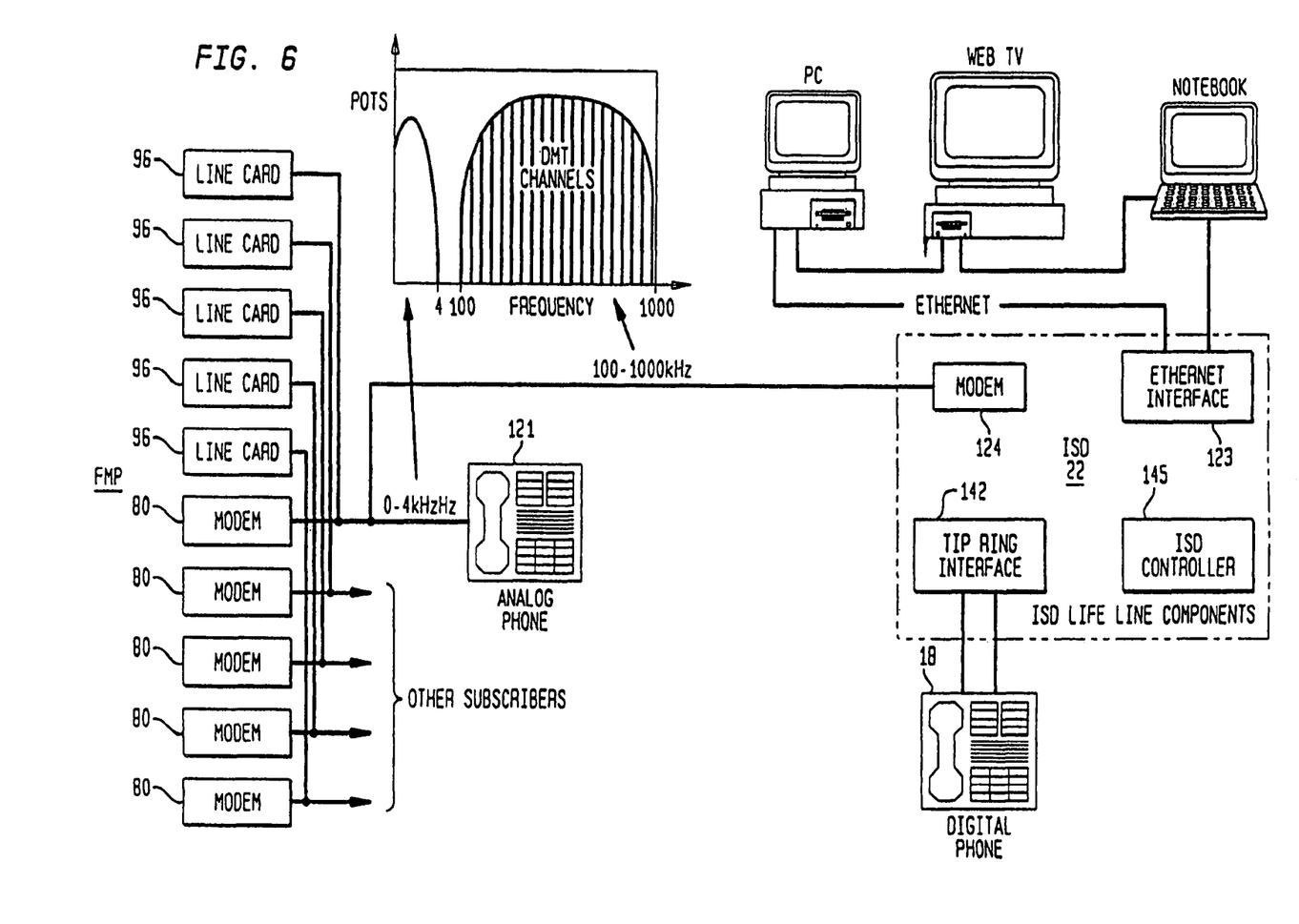
FIG. 6 illustrates life line components of the FMP.

Referring now also to FIGS. 5 and 6, a lifeline may be provided for continuous telephone service in the event of a power failure at the CPE 10. The lifeline may be utilized to connect the ISD 22 to the local telecommunications company's modified DLC 87, for ample in the FMP 32 located in the central office 34. The five modem connections to the cross connector 73 are switchable to respective connections to five line cards to provide telephone service (life line slice) in the event that the ISD 22 becomes inoperative. In a conventional digital loop carrier (as opposed to modified DLC 87) the line cards connect over twitted pairs to POTs to interface the digital backplane 90 and the analog POTs. In the modified DLC 87, they serve the same purpose when the line card is switched-in and the TVRC modem switched-out due to failure of a connected ISD 22. That is, the line cards serve as the terminations of the analog phone lines providing power to the telephones via a battery, supping the ringing voltage power, out of service testing and supervision of the subscriber terminal as well as interfacing the digital communications on the TDM backplane 90 to the analog system of the calling/called POT. Thus, in the event of failure of an ISD 22, the FMP, for that particular line, acts like a conventional DLC because the entire access nodule 70 and its features and the modified aspects of the DLC 87 are bypassed. In the event of a failure at the customer premises, battery supply to the subscriber line, out-of-service testing, ringing voltage supply, and supervision of subscriber terminals are also provided.

Referring now more particularly to FIG. 4A, a termination facility for subscriber lines 30 of access module 70 provides, in addition to line protection 71 and cross connector 73, a line monitor and controller 82. The latter may be a separate component or it may be a programmed function of controller & multiplexer 84. Line monitor controller 81 controls the life line switches. When a subscriber link is lost due to malfunction, a corresponding one of life line switches 78 is tripped from a position in which it connects the subscriber line to the modem 80 to a position in which it connects a respective line card 96. A corresponding life line switch 144 in the ISD 22 disconnects an analog telephone 121 from the tip ring interface 142 and connects the analog phone 121 directly to the subscriber lines 30. In these positions, the analog phone 121 is connected to the line card 96 as in ordinary telephone service so that the DLC 87 supplies battery backed up power, ringing, DTMF decoding, etc. This configuration provides normal telephone service through the analog telephone 121.

Referring particularly to FIG. 6, in the ISD 22 the life line switch 144 is controlled by a line monitor controller 141. The latter may be a separate part of the ISD 22 or it may be a function of an ISD controller 145 that controls the various functions of the ISD described elsewhere in the present application and in the copending applications incorporated by reference. The line monitoring facilities 141 and 81 controlling the life line switches 78 and 144 may monitor the integrity of the subscriber link by various means. In one implementation, these line monitors are battery powered components that listen for a message generated from the opposite end of the subscriber link 30 and, if they don't receive it within a period of time, they go to the default life-line connected states. The switches would also have a power-off state connecting the life line circuit.

Referring now to FIG. 7, another embodiment of the life line service is shown. In this embodiment, the analog telephone is connected permanently to the line card of the DLC 87 of the FMP 32. In this case, since the frequencies normally used by the plain old telephone service (POTS) range up to only about 4 kHz, the range used by the modems can simply avoid this portion it being substantially limited. So, for example the modems 124 and 80 may use only the frequency range above 100 kHz. This range would leave the range used by ISDN service available too. Power can still be supplied through the subscriber link 30. Thus, in the embodiment of life line service shown in FIG. 7, one or more regular telephones are connected to the subscriber twisted pair line (shown schematically as a single line, although in practice it is usually two twisted conductors). The subscriber twisted pair is connected to the line card 96 as in normal telephone service and the available frequencies above the range used by the POTS are used for the multiple access subscriber link discussed in this specification and in the related applications.

Under normal operation, the TVRC modems 80 demodulate a symbol generated on the subscriber lines 30 to output subscriber data including voice, signaling and user data, and apply the resulting data stream to the digital filters 82. As discussed above, the digital data from the ISDs 22 contain voice, digital information, and signaling from, potentially, many different subscriber equipment all multiplexed into the same data stream, preferably a packet-based protocol as discussed above. At a time when a call is just being dialed by the user, the data stream will contain signaling information (unless a voice-activated dialing feature is being used as discussed further below). At other times, signaling data may be generated automatically by subscriber equipment such as settop unit in the process of ordering a movie.

Call setup may be performed in a way that bypasses the normal interaction between the regular DLC (not shown) and the modified DLC 87 because the ISD 22 may send call signaling data as digital information to the FMP 32. Thus, there may be no need to interpret DTMF tones or dialing pulse. The FMP 32 may interact through the controller 92 set up the call conventionally through the modified DLC 87 by way of the TDM multiplexer 88. Or the signaling data from the subscriber link may be transmitted in the form of DTMF tones which are interpreted either through a DLC facility or by a detector in FMP 32. The direct mechanism for handling signaling data is preferred because DTMF tones would take up bandwidth unnecessarily.

Alternatively, calls can be routed directly to the digital network as packet data, for example. In such a process, where calls are placed digitally through the packet network signaling information may be sent to the NSP 46 along with control information informing the NSP 46 that a virtual circuit for a call is requested. If it is a voice call, a high priority must be given to the virtual circuit and the NSP 46 must make sure the bandwidth is available. At the time a call is made which is to be routed directly from the FMP 32 through the packet-switched networks (e.g. SONET or ATM), the FMP 32 may be handling data to and from the subscribers. At the time the request for a high priority voice channel is made, the ISD 22 has already de-allocated bandwidth assigned for data transmission to make room for the higher priority voice transmission. The FMP 32 communicates the demand for high priority bandwidth to the NSP 46 and the NSP 36 may deallocate bandwidth formerly dedicated to data transmission (the same data for which bandwidth was de-allocated by the ISD 22) as it, at the same time, allocates bandwidth for the high priority call. This may involve a transmission from the FMP 32 to the NSP 46 telling the NSP 46 that less low-priority data bandwidth is needed in the current call and high priority bandwidth is needed for the new voice call. The NSP 46 then responds by allocating or identifying available circuits (virtual) and providing the appropriate signaling. When the voice call is finished, similar dialogue between the FMP 32 and NSP 46 takes place. The termination of the call is detected by the FMP 32 and a message sent to the NSP 46 informing it that additional bandwidth is needed for data communications and no (or less) bandwidth for the voice call.

In the preferred embodiment, the voice and digital information is time domain multiplexed (TDM) in the digital data stream applied to the digital filters 82. This embodiment makes it simple and efficient to provide high priority to voice communications by the ISD 22 by providing a bandwidth on demand as discussed elsewhere in this application and in related applications incorporated by reference in this application. In the TDM system of the preferred embodiment, it is also convenient to filter out digitally voice data from the demodulated data streams and apply this data directly to the TDM backplane 90. The latter requires some discussion regarding routing.

The TDM multiplexer 88 takes the place of multiple line cards. As mentioned, it is the job of the line cards 96 in a conventional DLC to convert voice data to digital data and apply it to the TDM backplane 90. In so doing, it will also be the job of the control 92 and the facilities interface 94 to handle circuit (TDM) to/from packet conversion. In conventional DLCs voice data also includes DTMF tones which are decoded in the line cards 96 and used by the controller 92 for call setup. The same job is performed by the TDM multiplexer 88. Instead of DTMF tones, the routing data (called number, call origination data, signaling, etc.) are applied in digital form directly to the TDM backplane 90 for handling by the controller 92. Thus, TDM multiplexer 88 creates the appearance of being a line card (or set of line cards) to the controller and other facilities from the TDM backplane 90 and out through the interexchange network. The TDM multiplexer can be plugged as a single card directly into the TDM backplane 90. To the core network (the conventional switched network such as connected through the DLC), all equipment including the NSP 46, the FMP 32 appears to be a conventional DLC. This is advantageous, since there is minimal imp to the remainder of the network when the equipment is integrated into the network. This configuration provides a seamless interface between the fully digital telephone linked through the ISD 22 and the modified DLC 87. It also provides a system that allows packet switched voice and data to work side by side and together with traditional digital loop carrier equipment.

In the preferred embodiment, in the CO to CPE direction, the FMP 32 performs the following functions. First, the FMP 32 breaks up the control messages and packets containing user data into segments that fit into the DSL frames. Secondly, the FMP 32 multiplexes these frames together with frames containing speech so that the can be transported to the ISD 22 over the DSL link. Third, the FMP 32 terminates all link layers associated with the DSL segment of the connection. The reverse happens in the CPE to CO direction. FIG. 5 shows how the access module takes information from the DSL modems 201 and places the voice V1, V2, etc. and data D1, D2, etc. into frames 203, then multiplexes the frames 203. Consider a scenario where data is fed to the TVRC modems 201 and a voice call comes in. Assume that 1 Mbps is available for information transfer via the TVRC modems 201. Prior to the incoming call, all 1 Mbps is used up. However, as soon as a voice call comes in, since voice has a higher priority that data, a 64 Kbps channel (slot) is deallocated from data usage and is allocated for voice. If a second voice call comes in, then another data channel will be deallocated from data usage and allocated for voice. As the voice call gets terminated, then the allocated voice slots will be reallocated to use by data. Hence, the system dynamical allocates bandwidth in real time to maximize information transfer. Note that this time domain multiplexing could be performed with frequency domain multiplexing, as with a multitone channel, as well.

Within the local access side of the local loop, multiple FMPs 32 may be grouped and served by a single NSP 46. Each FMP 32 is in turn interconnected to a plurality of ISDs which serves the subscribers in a given local loop. Usually, the NSP 46 will be located in an AT&T Point-of-Presence (POP). However, this might not be possible in all areas and it could possibly be co-located with other equipment, depending on space availability.

Although, as discussed above, the TDM multiplexer 90 allows a seamless interface between the "old technology" DLC and "new technology" employing the access module 70 and the modified DLC 87 and other elements of the architecture described here and in related applications, substantial modifications to software of the controller 92 will provide additional features. These features are discussed here, elsewhere in this application, and in the related application incorporated by reference in this application. For example, when multiple calls to the same called party are made, the modified DLC 87 must handle such calls differently. In a conventional setup, a message would be sent by the DLC 87 that the called party is off-hook. In the current system of the invention, the called party may still receive additional calls to the same party. Another example of how software modifications for handling of voice calls is provided by the voice-activated call example that follows, after a discussion of the interaction between the NSP 36 and the FMP 32. Note that the details of such software modifications are not necessary to discuss in detail as such are quite straightforward to implement.

To illustrate the interaction between the various components of the instant invention, a voice dialing scenario will be described. When a subscriber picks up the telephone and if no digits have been dialed after a specified period of time has elapsed, the ISD 22 may start digitizing the voice information into data, for example, 64 Kbps-law PCM data. The voice samples are then stored in a wave file, which is subsequently transmitted to the FMP 32. On receipt by the FMP 32, the FMP 32 will forward the information to the NSP 36. The NSP 36 will attempt to authenticate the request by ensuring that the subscriber does indeed have a subscription to the voice dialing service. The NSP 36 can determine the identity of the subscriber by looking at the address in a certain field of the packet. The NSP 36 can therefore interpret the information in the wave files and take the appropriate action. Let us assume that subscriber John wanted to call another subscriber Paul. The NSP 36 will also attempt to determine who is Paul as defined by John. Once the telephone number for John has been determine the NSP 36 will inform the FMP 32 to set up a call to John's number. The FMP 32 will then go through the facilities interface 94 to set up the call. In an embodiment, this would be over TR303 interface and the signal would be sent to a DLC to request the local Serving Office to indicate the appropriate ports to use for setting up the call. The FMP 32 has its own DTMF and tone generator which is used for signaling when the interexchange carrier network is to be bypassed in routing a call. For example, the FMP 32 may be connected to a switched network that requires the generation of DTMF signals to set up a call. Such a call can be handled through the FMP 32.

Note that there is a significant advantage implicit in the preferred design. The voice dialing service may be provided by a different company from the one that actually connects the call. There is no need to pay for the Local Exchange Carrier (LEC) for providing such a service and it can all be done with a single facility. Similar services, such as speed dialing, that the LEC provides can now be made available locally.

In the case where there is an incoming call, say from the PSTN, the FMP will get the information from the DLC. The information will be dispatched over the signaling channel to the NSP 36. The NSP 36 will instruct the FMP 32 with the information on how the call should be terminated. On receiving this message, the FMP 32 will send the appropriate signaling message to the ISD 22. The ISD 22 "knows" which phones are in use and which ones are not. As a result, it will apply ring to a phone that is free.

In the CPE to CO direction, data "left over" after filtering of voice data is accomplished by the digital filters 84 is transmitted by the access module to the interexchange network. This data includes routing data as well as content. The link layer interface is provided by the controller and multiplexer 84 of the access module 70. Thus, for example, if the exported data is to be totted over an external ISDN interface, the data from digital filters 82 would be formatted and timed to be applied to such an interface by the controller and multiplexer 84 of the access module 70.

In the disclosure of the instant invention, Tethered Virtual Radio Channel (TVRC) is the preferred modulation technique. However, the instant invention is not limited to the use of TVRC modulation technology. However, TVRC would prove to be a major advantage over other proposed schemes, since it provides an alternate to interleaving which is used to overcome impairments such as noise and interference and which results in unacceptable delays.

In addition to monitoring the link between the ISD 22 and the FMP 32 for purposes of identifying a failure of the ISD 22 (which requires life-line support), the FMP 32 may provide other line monitoring functions, such as off-hook detection, through interaction with the intelligent ISD 22. For example, a subscriber, although the bandwidth is available to send an additional call to the same called number, may not wish to have additional calls ring through. The FMP 32 in such a case could respond to an additional call with a busy signal or voice mail.

In some embodiments, the FMP 32 may be configured to appear to the network as a conventional DLC. As an alternative configuration, the FMP 32 may be configured directly to connect to the ATM without transport across the SONET network. It may be desirable to transmit the voice data from the FMP 32 to the PSTN 42 over a high speed packet network (e.g. ATM), which is superimposed on top of the SONET network. This has an advantage in that the packet transmission of voice information can be more efficient than more conventional treatment (for example, it is susceptible to a high degree of compression). However, it requires additional management to manage delays, buffer overruns, drop packets, etc., across the ATM network as mentioned above.

The following applications, filed concurrently herewith, are hereby incorporated by reference:

1. A Hybrid Fiber Twisted-pair Local Loop Network Service Architecture (Ser. No. 09/001,360);

2. Dynamic Bandwidth Allocation for use in the Hybrid Fiber Twisted-pair Local Loop Network Service Architecture (Ser. No. 09/001,425);
3. The VideoPhone (Ser. No. 09/001,905);
4. VideoPhone Privacy Activator (Ser. No. 09/001,909);
5. VideoPhone Form Factor (09/001,583);
6. VideoPhone Centrally Controlled User Interface With User Selectable Options (Ser. No. 09/001,576);
7. VideoPhone User Interface Having Multiple Menu Hierarchies (Ser. No. 09/001,908);
8. VideoPhone Blocker (Ser. No. 09/001,353);
9. VideoPhone Inter-coin For Extension Phones (Ser. No. 09/001,358);
10. Advertising Screen Saver Ser. No. 09/001,574;
11. Information Display for Visual Communication Device (Ser. No. 09/001,906);
12. VideoPhone Multimedia Announcement Answering Machine (Ser. No. 09/001,911);
13. VideoPhone Multimedia Announcement Message Toolkit (Ser. No. 09/001,345);
14. VideoPhone Multimedia Video Message Reception (Ser. No. 09/001,362);
15. VideoPhone Multimedia Interactive Corporate Menu Answering Machine Announcement (Ser. No. 09/001,575);
16. VideoPhone Multimedia Interactive On-Hold Information Menus (Ser. No. 09/001,356);
17. VideoPhone Advertisement When Calling Video Non-enabled VideoPhone Users (Ser. No. 09/001,361);
18. Motion Detection Advertising (Ser. No. 09/001,355);
19. Interactive Commercials (Ser. No. 09/001,578);
20. VideoPhone Electronic Catalogue Service (Ser. No. 09/001,421);
21. A Multifunction Interface Facility Connecting Wideband Multiple Access Subscriber Loops With Various Networks (Ser. No. 09/001,356);
22. Life Line Support for Multiple Service Access on Single Twisted-pair (Ser. No. 09/001,343);
23. A Network Server Platform (NSP) For a Hybrid Fiber Twister-pair (HFTP) Local Loop Network Service Architecture (Ser. No. 09/001,582).
24. A Communication Server Apparatus For Interactive Commercial Service (Ser. No. 09/001,344);
25. NSP Based Multicast Digital Program Delivery Services (Ser. No. 09/001,580);
26. NSP Internet, JAVA Server and VideoPhone Application Server (Ser. No. 09/001,354);
27. NSP WAN Interconnectivity Services for Corporate Telecommuting (Ser. No. 09/001,540);
28. NSP Telephone Directory White-Yellow Page Services (Ser. No. 09/001,426);
29. NSP Integrated Billing System For NSP services and Telephone services (Ser. No. 09/001,359);
30. Network Server Platform/Facility Management Platform Catching Server (Ser. No. 09/001,419);
31. An Integrated Services Director (ISD) Overall Architecture (Ser. No. 09/001,417);
32. ISD/VideoPhone (Customer Premises) Local House Network (Ser. No. 09/001,418);
33. ISD Wireless Network (Ser. No. 09/001,363);
34. ISD Controlled Set-Top Box (Ser. No. 09/001,424);
35. Integrated Remote Control and Phone (Ser. No. 09/001,423);
36. Integrated Remote Control and Phone User Interface (Ser. No. 09/001,420);
37. Integrated Remote Control and Phone Form Factor (Ser. No. 09/001,910);
38. VideoPhone Mail Machine (Ser. No. 60/070,104);
39. Restaurant Ordering Via VideoPhone (Ser. No. 60/070,121);
40. Ticket Ordering Via VideoPhone (Ser. No. 60/070,103);
41. Multi-Channel Parallel/Serial Concatenated Convolutional Codes And Trellis Coded Modulation Encode/Decoder (Ser. No. 09/001,342);
42. Spread Spectrum Bit Allocation Algorithm (Ser. No. 09/001,842);
43. Digital Channelizer With Arbitrary Output Frequency (Ser. No. 09/001,581);
44. Method and Apparatus For Allocating Data Via Discrete Multiple Tones (Ser. No. 08/997,167); and
45. Method and Apparatus For Reducing Near-End Cross Talk In Discrete Multi-Tone Modulators/Demodulators (Ser. No. 08/997,176).

While exemplary systems and methods embodying the present invention are shown by way of example, it will be understood, of course, that the invention is not limited to these embodiments. Modifications may be made by those skilled in the art, particularly in fight of the foregoing teachings. For example, each of the elements of the aforementioned embodiments may be utilized alone or in combination with elements of the other embodiments.

We claim:

1. A method for use with a telecommunication facilities management platform, said platform connected to a subscriber telecommunications device via a subscriber line associated with a subscriber, said method comprising:
receiving at a modem in an access module a communication from said telecommunications device said communication comprising at least one of a digital communication and an analog communication;
transmitting said communication over at least one data network connected to said access module;
detecting at said telecommunication facilities management platform a power failure associated with said subscriber by determining that a status signal has not been received from a subscriber server in a predetermined period of time; and
in response to the detection of said power failure, transmitting said analog communication to a line card in a digital loop carrier associated with a telephony network by bypassing said modem.

2. The method of claim 1 wherein said subscriber server comprises an intelligent services director located at a subscriber premises.

3. The method of claim 2 wherein the step of detecting a power failure comprises detecting a loss of power to said intelligent services director.

4. The method of claim 1 wherein said at least one data network comprises a packet switched network.

5. The method of claim 1 further comprising:
in response to the detection of said power failure, providing battery power to said telecommunications device.

6. The method of claim 1 further comprising:
in response to the detection of said power failure, providing ringing service to said telecommunications device.

7. A facilities management platform for use in maintaining telecommunications service for a subscriber in the event of a power failure, said subscriber associated with a telecommunications device, said facilities management platform comprising:

a modem for receiving a communication from said telecommunications device, said communication comprising at least one of a digital communication and an analog communication;
a controller adapted to transmit said communication over at least one data network connected to said access module;
means for detecting at said telecommunication facilities management platform a power failure associated with said subscriber by determining that a status signal has not been received from a subscriber server in a predetermined period of time; and
means for routing, in response to the detection of said power failure associated with said subscriber, said analog communication to a line card in a digital loop carrier associated with a telephony network by bypassing said modem.

8. The facilities management platform of claim 7 wherein said subscriber server comprises an intelligent services director located at a subscriber premises.

9. The facilities management platform of claim 8 wherein said means for detecting comprises means for detecting a loss of power to said intelligent services director.

10. The facilities management platform of claim 7 wherein said at least one data network comprises a packet switched network.

11. The facilities management platform of claim 7 further comprising:
means for providing, in response to the detection of said power failure, battery power to said telecommunications device.

12. The facilities management platform of claim 7 further comprising:
means for providing, in response to the detection of said power failure, ringing service to said telecommunications device.

* * * * *